United States Patent [19]

Rudi

[11] Patent Number: 4,636,903
[45] Date of Patent: Jan. 13, 1987

[54] SAFETY DEVICE FOR TAPE CASSETTES FOR POSITIONALLY CORRECT INSERTION OF THE TAPE CASSETTE INTO AN ACCEPTANCE DEVICE

[75] Inventor: Guttorm Rudi, Fjellhamar, Norway

[73] Assignee: Tandberg Data A/S, Oslo, Norway

[21] Appl. No.: 633,596

[22] Filed: Jul. 23, 1984

[30] Foreign Application Priority Data

Sep. 6, 1983 [DE] Fed. Rep. of Germany ....... 3332157

[51] Int. Cl.$^4$ ...................... G11B 23/02; G11B 5/008; G11B 15/00; G11B 17/00
[52] U.S. Cl. ........................................ 360/132; 360/95; 360/96.5; 242/198; 242/199
[58] Field of Search ................ 360/132, 93, 96.1–96.6, 360/137; 242/191–200

[56]  References Cited

U.S. PATENT DOCUMENTS

| 3,650,378 | 3/1972 | Kakiuchi et al. | 360/132 |
| 3,971,071 | 7/1976 | Urayama | 360/132 |
| 3,976,262 | 8/1976 | Kennedy | 360/96.5 |
| 3,977,624 | 8/1976 | Leifer et al. | 242/198 |
| 4,257,075 | 3/1981 | Wysocki et al. | 360/96.5 |
| 4,311,286 | 1/1982 | Akino et al. | 242/198 |
| 4,372,504 | 2/1983 | Shibata et al. | 242/198 |
| 4,476,504 | 10/1984 | Georges | 360/96.5 |

FOREIGN PATENT DOCUMENTS

| 52-2410 | 10/1977 | Japan | 360/96.5 |
| 55-70963 | 5/1980 | Japan | 360/96.5 |
| 55-146656 | 11/1980 | Japan | 360/96.5 |
| 58-70454 | 4/1983 | Japan | 360/96.5 |
| 58-196654 | 11/1983 | Japan | 360/96.5 |
| 59-165266 | 9/1984 | Japan | 360/96.5 |

Primary Examiner—John H. Wolff
Assistant Examiner—Alfonso Garcia
Attorney, Agent, or Firm—Hill, Van Santen, Steadman & Simpson

[57] ABSTRACT

The safety device for tape cassettes for the positionally correct insertion of the tape cassettes into an acceptance device comprises a tongue-shaped spring element disposed at the floor of the acceptance device, a ramp edge being disposed at the free end of said spring element, with said ramp edge cooperating with the front edge of said tape cassette and being displaceable by said front edge out of the insertion region upon insertion of said tape cassette. A stop piece engaging behind the ramp edge in the direction toward the fastening end of the spring element is connected to the ramp edge, the stop piece interacting with a recess of the tape cassette such that, given positionally correct insertion of the tape cassette into the acceptance device, the stop piece first slides into the recess and, upon continued insertion of the cassette, the front edge thereof displaces the stop piece out of the insertion region via the ramp edge. Upon improper side-inverted insertion of the tape cassette, the cassette can only be inserted up to the stop piece.

3 Claims, 5 Drawing Figures

SAFETY DEVICE FOR TAPE CASSETTES FOR POSITIONALLY CORRECT INSERTION OF THE TAPE CASSETTE INTO AN ACCEPTANCE DEVICE

BACKGROUND OF THE INVENTION

1. Field of the Invention

The invention relates to a safety device for tape cassettes to assure correct insertion of the cassette into a cassette player.

2. Description of the Prior Art

Safety devices to assure correct insertion of the cassette are well known and have been successfully employed. Given, for example, so-called floppy disks, a flexible magnetic storage which is disposed in a paper sheath, it is standard to provide a recess at the edge of the paper sheath which is sensed inside the play-back means via an electric switch means and which guarantees a positionally correct insertion of the magnetic disk in the playback and recording device.

It is also standard in magnetic tape cassettes to broaden the magnetic tape cassette housing in the region of the magnetic head so that a side-inverted insertion into the acceptance device of the magnetic tape cassette is impossible.

In order to prevent unintentional erasure of magnetic tape cassettes, it is also standard to provide the magnetic tape cassettes housings with recesses into which sensing pins engage in the inserted condition of the magnetic tape cassette and actuate an inhibit means depending on the penetration depth of the pin.

All of these safety devices have a relatively complicated structure and require involved evaluation means inside of the apparatus under certain conditions.

SUMMARY OF THE INVENTION

An object of the invention is to provide a safety device of the type described above which is simple and cost-effective such that a positionally wrong insertion of the tape cassette into the acceptance device is not possible.

A wrong insertion of the tape cassette into the acceptance device is prevented by means of the inventive arrangement of a tongue-shaped spring element in the acceptance device having a corresponding ramp edge and stop piece which cooperates with a recess at the front edge of the cassette. Thus, given a side-inverted position of the tape cassette, the tape cassette can only be inserted into the insertion apparatus up to the stop piece which will prevent insertion of the cassette.

The overall safety device is simple and is not susceptible to disruption due to the design of the tongue-shaped spring element as a one-piece punched part in combination with the recess at the front edge of the tape cassette. Disruptions in function due to dirt and the like cannot occur.

BRIEF DESCRIPTION OF THE DRAWINGS

An embodiment of the invention is shown in the drawings and shall be explained in greater detail below by way of example.

DESCRIPTION OF THE PREFERRED EMBODIMENTS

Figure 1:
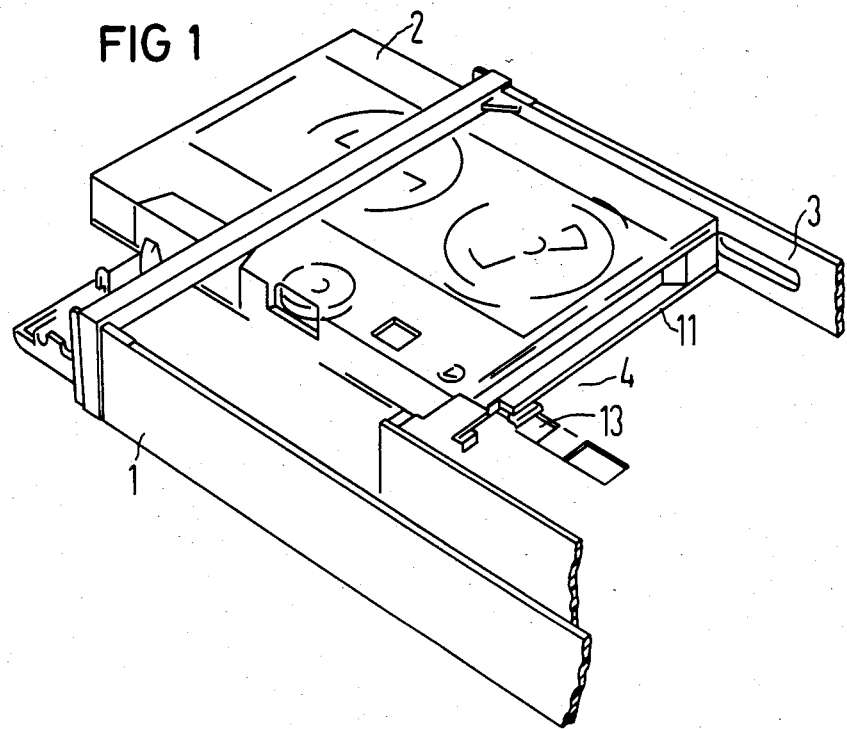
FIG. 1 is a schematic perspective illustration of the safety device inside of the acceptance device for a magnetic tape cassette.
Figure 2:
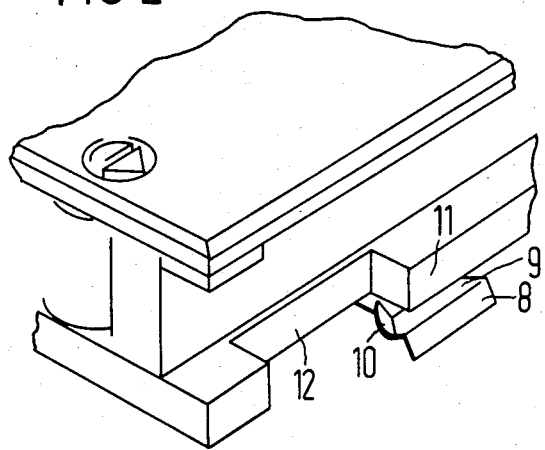
FIG. 2 is an enlarged partial illustration of the safety device according to FIG. 1.

A magnetic tape player cassette 1, which is only schematically shown here, contains an acceptance device 3 designed as an insertion channel for a magnetic tape cassette 2, the magnetic head together with the appertaining drive elements for a magnetic tape cassette 2 being disposed in said acceptance device 3, although they are not shown. A tongue-shaped spring element 6 is secured by appropriate fastening means such as rivets 7 in a floor region 4 of the acceptance device at a distance from the back stop 5 of the acceptance device. A ramp edge 8 which is provided with an oblique ramp 9 is provided at the free end of said spring element. A tab-shaped stop piece 10 is formed laterally next to said ramp edge and is rigidly connected thereto, the stop piece 10 engaging behind the ramp edge in the direction toward the fixed end of the spring element 6. The overall tongue-shaped spring element is thereby formed of one piece from a punched part and cooperates with a recess 12 applied to a front edge 11 of the magnetic tape cassette 2.

The function of the tongue-shaped spring element in combination with the recess 12 shall now be explained in greater detail with reference to FIGS. 2 through 5.

Figure 3:
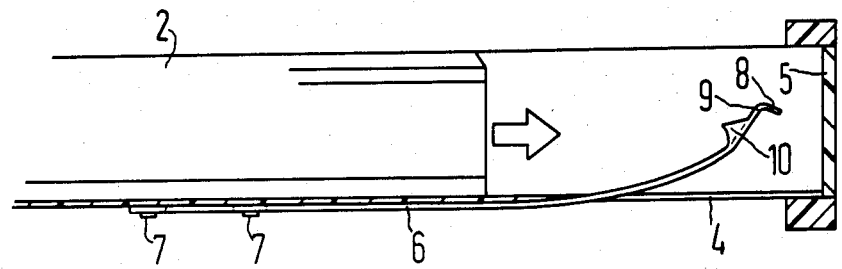
FIG. 3 is a partial side view of the device illustrating a positionally wrong insertion of the magnetic tape cassette.
Figure 4:
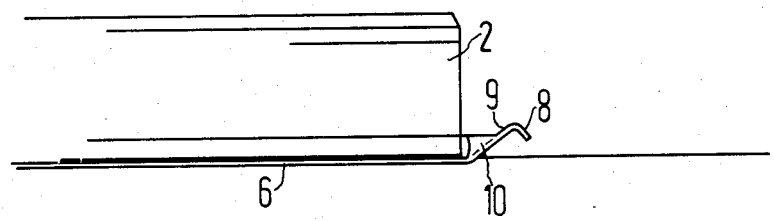
FIG. 4 is a partial side view of an improper insertion continuing from FIG. 3.

When, as shown in FIGS. 3 and 4, the magnetic tape cassette 2 is improperly inserted side-inverted into the acceptance device 3, the tongue-shaped spring element 6 is engaged only by an edge without recess 12. Upon insertion, the magnetic tape cassette housing 2 therefore runs up against the hook-like stop piece 10 and can only be inserted up to a position at a distance from the stop 5. The projecting cassette indicates to the user an improper insertion direction.

Figure 5:
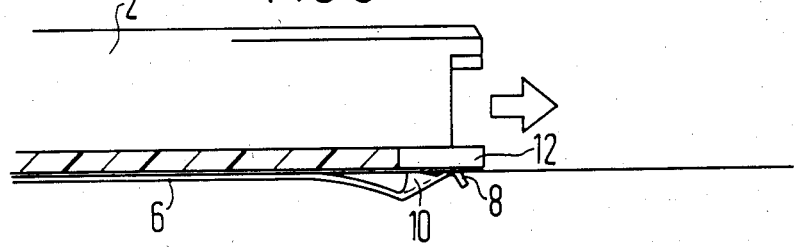
FIG. 5 is a partial side view of the safety device illustrating a positionally correct insertion of the magnetic tape cassette.

Upon a positionally correct insertion of the magnetic tape cassette 2 in accord with the illustration of FIG. 5, the hook-shaped stop piece 10 slides past at the lateral edge of the recess 12 upon insertion, so that the front edge 11 can run up onto the oblique ramp 9 of the ramp edge 8. Upon further insertion motion of the magnetic tape cassette, the ramp edge 8 is pressed down in combination with the stop piece 10 via the front edge 11 into a recess 13 in the cassette player floor 4, thereby allowing the magnetic tape cassette to be completely inserted into the acceptance device up to the stop 5.

Other embodiments of the safety device are, of course, conceivable in addition to the illustrated embodiment. Thus, for example, the ramp edge in combination with the stop piece can be disposed on a spring which extends perpendicular to the insertion direction. Or, on the other hand, the overall safety device may be situated not at the floor of the acceptance device but at the back lateral part.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limited to the present invention, excepting as it is set forth and defined in the hereto appended claims.

I claim as my invention:

1. A safety device for tape cassette players for assuring positionally correct insertion of a tape cassette into an acceptance device, comprising the combination of:
   a tongue-shaped spring element secured at one end in an acceptance device with a second end being free;
   an oblique ramp edge disposed on said free end of said spring element in an insertion channel of said acceptance device and at a distance from a back stop region, said ramp edge being displaceable via a front edge of a tape cassette out of said insertion channel and against a spring power of said spring element;
   a stop piece engageable behind said ramp edge and securely connected to and laterally adjacent said ramp edge on said free end of said spring element;
   said spring element, ramp edge and stop piece all being fabricated from a one-piece punch part;
   said tape cassette having a recess at said front edge, with said recess being disposed on said front edge to be in alignment with said stop piece;
   whereby upon positionally correct insertion of said tape cassette into said acceptance device, said stop piece first slides into said recess and, upon continued insertion of said cassette, said front edge displaces said stop piece out of said insertion channel via said ramp edge.

2. A safety device for use in a tape cassette player having an insertion channel for receiving a tape cassette comprising:
   a one-piece leaf spring element secured at one end in said insertion channel and having a free end;
   a stop member formed on said leaf spring engageable with an end of said tape cassette to prevent complete insertion of said cassette into said channel,
   a ramp member also formed on said spring element and being positioned laterally adjacent said stop member, said ramp member being biased into said insertion channel to be engageable with said end of said tape cassette,
   a recess in said tape cassette aligned with said stop member when said cassette is inserted in the proper positional orientation,
   whereby upon proper insertion of said cassette, said end of said cassette will engage said ramp member when said stop member is in said recess and further insertion of said cassette will cause said ramp member to move out of said insertion channel carrying said stop member to allow complete insertion of said cassette.

3. A mechanism for preventing improper positional insertion of a tape cassette into an insertion channel of a tape cassette player comprising:
   a one-piece leaf spring secured at one end to a wall of said insertion channel and having an opposite free end normally biased into said channel,
   a hook-like stop piece formed at said free end of said leaf spring to normally project into said channel engageable with an end of said cassette to prevent continued insertion of said cassette into said channel,
   a recess formed in said cassette aligned with said stop piece only upon proper positional insertion of said cassette,
   a ramp piece formed on said leaf spring adjacent to said stop piece and engageable with said end of said cassette adjacent said recess,
   whereby, upon improper positional insertion of said cassette, said stop member will engage said end of said cassette preventing further insertion into said channel, but upon proper positional insertion, said end of said cassette will engage said ramp member and urge said said ramp member and the stop member out of said channel to permit continued insertion of said cassette.

* * * * *